(12) United States Patent
Taoka et al.

(10) Patent No.: US 9,303,146 B2
(45) Date of Patent: Apr. 5, 2016

(54) ALKYL-MODIFIED VINYL ALCOHOL POLYMER SOLUTION

(71) Applicant: KURARAY CO., LTD, Kurashiki-shi (JP)

(72) Inventors: Yuta Taoka, Kurashiki (JP); Shinsuke Nii, Tainai (JP); Masato Nakamae, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/351,734

(22) PCT Filed: Oct. 11, 2012

(86) PCT No.: PCT/JP2012/076290
§ 371 (c)(1),
(2) Date: Apr. 14, 2014

(87) PCT Pub. No.: WO2013/054834
PCT Pub. Date: Apr. 18, 2013

(65) Prior Publication Data
US 2014/0243462 A1  Aug. 28, 2014

(30) Foreign Application Priority Data

Oct. 14, 2011 (JP) ................................. 2011-227306

(51) Int. Cl.
| | |
|---|---|
| C08K 5/06 | (2006.01) |
| C08K 5/42 | (2006.01) |
| C08K 3/20 | (2006.01) |
| C08F 216/06 | (2006.01) |
| C08L 71/02 | (2006.01) |

(52) U.S. Cl.
CPC ................. *C08K 5/42* (2013.01); *C08F 216/06* (2013.01); *C08K 3/20* (2013.01); *C08K 5/06* (2013.01); *C08L 71/02* (2013.01)

(58) Field of Classification Search
CPC .............. C08K 5/06; C08K 5/42; C08K 3/20
See application file for complete search history.

(56) References Cited

U.S. PATENT DOCUMENTS

| | | | |
|---|---|---|---|
| 4,144,388 A | 3/1979 | Yatsu et al. | |
| 2002/0102283 A1* | 8/2002 | Piot et al. | ....................... 424/401 |
| 2013/0209817 A1* | 8/2013 | Nii et al. | ....................... 428/511 |

FOREIGN PATENT DOCUMENTS

| | | | |
|---|---|---|---|
| JP | 59 42325 | 3/1984 | |
| JP | 8 281092 | 10/1996 | |
| JP | 9 316434 | 12/1997 | |
| JP | 10 265753 | 10/1998 | |
| JP | 10 265754 | 10/1998 | |
| JP | 10 338714 | 12/1998 | |
| JP | 2000 192003 | 7/2000 | |
| JP | 2002 129031 | 5/2002 | |
| JP | 3758705 B2 | 3/2006 | |
| JP | 2008 291120 | 12/2008 | |
| WO | WO 2011/155546 A1 * | 12/2001 | .............. C08F 16/06 |
| WO | 2011 155546 | 12/2011 | |
| WO | 2012 124746 | 9/2012 | |

OTHER PUBLICATIONS

International Search Report Issued Jan. 8, 2013 in PCT/JP12/076290 Filed Oct. 11, 2012.
Extended European Search Report Issued Jun. 1, 2015 in Patent Application No. 12840066.0.

* cited by examiner

*Primary Examiner* — Robert Harlan
(74) *Attorney, Agent, or Firm* — Oblon, McClelland, Maier & Neustadt, L.L.P.

(57) ABSTRACT

An alkyl-modified PVA solution is provided which has low viscosity at high temperatures leading to superior handleability, accompanied by rapidly increased viscosity upon lowering of the temperature, even in the case in which the concentration of the alkyl-modified PVA in a solution is increased. An alkyl-modified vinyl alcohol polymer solution containing an alkyl-modified vinyl alcohol polymer, a surfactant and water. The alkyl-modified vinyl alcohol polymer has a monomer unit that includes an alkyl group having 5 to 29 carbon atoms. The percentage content of the monomer unit is no less than 0.05 mol % and no greater than 5 mol %. The degree of saponification of the alkyl-modified vinyl alcohol polymer is no less than 20 mol % and no greater than 99.99 mol %. The surfactant is a compound represented by the following formula (I) having hydrophilic groups $X^1$ and $X^2$, and an alkyleneoxy group having 3 to 5 carbon atoms ($-R^1-O-$).

$$X^1-O+(R^1-O)_m R^2-X^2 \quad (I)$$

12 Claims, No Drawings

ALKYL-MODIFIED VINYL ALCOHOL POLYMER SOLUTION

TECHNICAL FIELD

The present invention relates to an alkyl-modified vinyl alcohol polymer solution.

BACKGROUND ART

A vinyl alcohol polymer (hereinafter, may be abbreviated as "PVA") has superior film-forming properties, interface characteristics and strength characteristics as one of few crystalline water soluble polymers. Therefore, PVA has been widely utilized as a thickening agent, a coating agent for paper, an adhesive, a processing agent for fibers, a binder, an emulsion stabilizer, a material of films and fibers, and the like. Furthermore, in order to improve specific performances of PVA, development of modified PVAs has been carried out by way of controlling crystallinity, introduction of a functional group and the like. Furthermore, a PVA-boric acid crosslinking solution in which a crosslinking reaction is caused by adding boric acid to PVA or the like has a property to gelate at low temperatures; therefore, the PVA-boric acid crosslinking solution is used for the purpose of controlling shape retention performances, or enhancing the strength of PVA matrices. However, for reasons such as toxicity of boron, and the like, restriction of the amount of boric acid or the like which may be used has started in recent years. Thus, a novel PVA or a PVA solution is demanded, which can be an alternative to PVA-boric acid crosslinking solutions, and the viscosity of which depending on the temperature can be controlled.

In known methods for increasing the viscosity of an aqueous PVA solution, an alkyl-modified PVA having an alkyl group introduced thereto is used. Such an alkyl-modified PVA is useful as a thickening agent for paints or adhesives since an interaction of alkyl groups (hydrophobic groups) occurs in water-based solvents to give a solution having high viscosity, and thus alkyl-modified PVAs having various types of monomer unit were also developed (see Japanese Unexamined Patent Application, Publication Nos. 2008-291120 and H10-338714). Although aqueous solutions of these alkyl-modified PVAs have a high viscosity at normal temperatures, the solutions have a high viscosity also at high temperatures, leading to inferior handleability; therefore, disadvantages of difficulties in preparation to give a homogeneous state, in particular, difficulties in preparation of an aqueous solution having a high concentration, and the like have been indicated.

PRIOR ART DOCUMENTS

Patent Documents

Patent Document 1: Japanese Unexamined Patent Application, Publication No. 2008-291120
Patent Document 2: Japanese Unexamined Patent Application, Publication No. H10-338714

SUMMARY OF THE INVENTION

Problems to be Solved by the Invention

The present invention was made in view of the foregoing circumstances, and an object of the present invention is to provide an alkyl-modified PVA solution which has, even in the case in which the concentration of the alkyl-modified PVA in a solution is increased, a low viscosity at high temperatures leading to superior handleability, accompanied by rapidly increased viscosity upon lowering of the temperature. In other words, an object of the present invention is to provide an alkyl-modified PVA solution that exhibits a behavior similar to that of PVA-boric acid crosslinking solutions, and having a viscosity that can be controlled depending on the temperature.

Means for Solving the Problems

An aspect of the present invention made for achieving the object is directed to an alkyl-modified PVA solution containing an alkyl-modified PVA, a surfactant and water, in which: the alkyl-modified PVA has a monomer unit that includes an alkyl group having 5 to 29 carbon atoms; a percentage content of the monomer unit is no less than 0.05 mol % and no greater than 5 mol %; a degree of saponification of the alkyl-modified PVA is no less than 20 mol % and no greater than 99.99 mol %; and the surfactant is a compound represented by the following formula (I).

$$X^1\text{—}O\text{—}(R^1\text{—}O)_m\text{—}R^2\text{—}X^2 \tag{I}$$

In the formula (I), $R^1$ represents an alkylene group having 3 to 5 carbon atoms; $R^2$ represents a single bond or an alkylene group having 1 to 5 carbon atoms; $X^1$ represents a hydrogen atom or an organic group; $X^2$ represents a hydrophilic group; and m is an integer of 1 to 100, wherein provided that m is at least 2, $R^1$s present in a plurality of number are each independently as defined above.

The alkyl-modified PVA solution contains the surfactant having the above specific structure. This surfactant has superior miscibility with the alkyl-modified PVA and water, and hydrophobicity thereof changes depending on the temperature; therefore, a hydrophobic interaction of alkyl groups included in the alkyl-modified PVA can be inhibited at high temperatures, whereas the interaction can be promoted at low temperatures. As a result, the alkyl-modified PVA solution has low viscosity at high temperatures and is thus superior in handleability, whereas the solution exhibits a gelation behavior at low temperatures as the viscosity rapidly increases at low temperatures.

$X^2$ preferably represents a carboxyl group or a salt thereof, a sulfonic acid group or a salt thereof, or a group represented by the following formula (II).

$$\text{—}(CH_2CH_2O)_{n1}\text{H} \tag{II}$$

In the formula (II), n1 is an integer of 1 to 200.

When $X^2$ represents the aforementioned specific group, the alkyl-modified PVA solution is further superior in handleability at high temperatures and a gelation ability at low temperatures.

The organic group which may be represented by $X^1$ is preferably an alkyl group having 1 to 29 carbon atoms or a hydrophilic group. When $X^1$ represents the above specific group, the alkyl-modified PVA solution is superior in handleability at high temperatures and the gelation ability at low temperatures.

The hydrophilic group which may be represented by $X^1$ is more preferably a group represented by the following formula (III).

$$\text{H}\text{—}(OCH_2CH_2)_{n2}\text{—} \tag{III}$$

In the formula (III), n2 is an integer of 1 to 200.

When $X^1$ represents the above specific group, handleability at high temperatures and the gelation ability at low temperatures of the alkyl-modified PVA solution can be further improved.

The monomer unit is preferably represented by the following formula (IV).

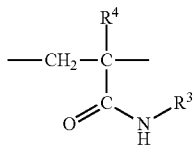

In the formula (IV), $R^3$ represents an alkyl group having 5 to 29 carbon atoms; and $R^4$ represents a hydrogen atom or an alkyl group having 1 to 8 carbon atoms.

When the monomer unit has the above specific structure, controllability of the viscosity of the alkyl-modified PVA solution can be further enhanced.

The alkyl-modified PVA that includes the monomer unit represented by the above formula (IV) is preferably obtained by saponifying a copolymer of an unsaturated monomer represented by the following formula (V) with a vinyl ester monomer.

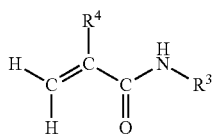

In the formula (V), $R^3$ and $R^4$ are as defined in connection with the above formula (IV).

When the alkyl-modified PVA contained in the alkyl-modified PVA solution is obtained by saponifying the copolymer of the above specific monomers, adjustment of a degree of saponification and the like of the alkyl-modified PVA can be facilitated, and viscosity controllability and the like can be further improved. In addition, miscibility with water can be even further improved, and thus a solution that is superior in practical applicability can be produced.

The alkyl-modified PVA has a viscosity average degree of polymerization of preferably no less than 200 and no greater than 5,000. When the viscosity average degree of polymerization of the alkyl-modified PVA falls within the above range, superior gelation ability at low temperatures of the alkyl-modified PVA solution can be further improved.

The mass ratio of the surfactant to the water (mass of the surfactant/mass of water) is preferably no less than 1/99 and no greater than 40/60. When the mass ratio of the surfactant to the water falls within the above range, superior handleability at high temperatures and the superior gelation ability at low temperatures of the alkyl-modified PVA solution can be even further improved.

The concentration of the alkyl-modified PVA is preferably no less than 0.5% by mass and no greater than 50% by mass. When the concentration of the alkyl-modified PVA falls within the above range, superior handleability at high temperatures and the superior gelation ability at low temperatures of the alkyl-modified PVA solution can be even further improved.

It is to be noted that the alkyl-modified PVA solution in a gelled state is also included in the scope of the alkyl-modified PVA solution.

Effects of the Invention

The alkyl-modified PVA solution of the present invention has, even in a case in which the solution contains the alkyl-modified PVA at a high concentration, properties of having a low viscosity at high temperatures leading to superior handleability, accompanied by rapidly increased viscosity to result in gelation upon lowering of the temperature. Therefore, the alkyl-modified PVA solution can be suitably used as a solution gelled at low temperatures that is superior in safety and that can be an alternative to PVA-boric acid crosslinking solutions. As referred to herein, "gelation at low temperatures" includes not only changes to become gelatinous of an alkyl-modified PVA solution when the temperature falls, but also changes of increasing a viscosity of an alkyl-modified PVA solution as the temperature falls.

DESCRIPTION OF EMBODIMENTS

Hereinafter, embodiments of the alkyl-modified PVA solution of the present invention will be described in detail.

Alkyl-Modified PVA Solution

The alkyl-modified PVA solution according to an embodiment of the present invention contains an alkyl-modified PVA, a surfactant and water. In addition, the alkyl-modified PVA solution may contain an optional component as long as principles of the present invention are not impaired. Hereinafter, these components will be described in detail.

Alkyl-Modified PVA

The alkyl-modified PVA contained in the alkyl-modified PVA solution of the embodiment of the present invention has a monomer unit that includes an alkyl group having 5 to 29 carbon atoms. More specifically, the alkyl-modified PVA is a copolymer having the monomer unit that includes an alkyl group having 5 to 29 carbon atoms, and a vinyl alcohol monomer unit. In addition, the alkyl-modified PVA may further have other monomer unit. When the alkyl group has less than 5 carbon atoms, a hydrophobic interaction among the alkyl groups does not sufficiently occur; therefore, the gelation ability at low temperatures is deteriorated. On the other hand, when the alkyl group has more than 29 carbon atoms, water solubility and handleability at high temperatures of the alkyl-modified PVA are deteriorated. Of these, in light of even further improvement of the gelation ability at low temperatures, the alkyl group has preferably 8 to 29 carbon atoms, more preferably 12 to 27 carbon atoms, still more preferably 15 to 26 carbon atoms, and particularly preferably 17 to 24 carbon atoms.

The monomer unit that includes an alkyl group having 5 to 29 carbon atoms is preferably a monomer unit derived from an α-olefin such as 1-octene or 1-decene;

a monomer unit derived from a vinyl ether such as pentyl vinyl ether, octyl vinyl ether, nonyl vinyl ether, dodecyl vinyl ether or octadecyl vinyl ether; or a monomer unit represented by the following formula (IV), and more preferably a monomer unit represented by the following formula (IV), wherein $R^3$ represents an alkyl group having 8 to 29 carbon atoms.

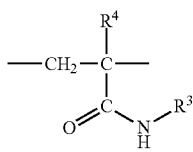

(IV)

In the above formula (IV), $R^3$ represents an alkyl group having 5 to 29 carbon atoms; and $R^4$ represents a hydrogen atom or an alkyl group having 1 to 8 carbon atoms.

Examples of the alkyl group having 5 to 29 carbon atoms represented by $R^3$ include a pentyl group, a hexyl group, a heptyl group, an octyl group, a nonyl group, a decyl group, a dodecyl group, a pentadecyl group, a nonadecyl group, and the like. Of these, in light of even further improvement of the gelation ability at low temperatures, the alkyl group has preferably 8 to 29 carbon atoms, more preferably 12 to 27 carbon atoms, still more preferably 15 to 26 carbon atoms, and particularly preferably 17 to 24 carbon atoms.

Examples of the alkyl group having 1 to 8 carbon atoms represented by $R^4$ include a methyl group, an ethyl group, a propyl group, a butyl group, a pentyl group, a hexyl group, and the like. Of these, a methyl group is preferred.

In light of ease in synthesis, etc., $R^4$ preferably represents a hydrogen atom or a methyl group.

It is to be noted that the alkyl group which may be represented by $R^3$ and $R^4$ may have a substituent such as a halogen atom within a range not leading to impairment of principles of the present invention, but the alkyl group which may be represented by $R^3$ and $R^4$ preferably does not have such a substituent.

A percentage content of the monomer unit that includes an alkyl group having 5 to 29 carbon atoms in the alkyl-modified PVA is essentially no less than 0.05 mol % and no greater than 5 mol %, preferably no less than 0.1 mol % and no greater than 2 mol %, and more preferably no less than 0.2 mol % and no greater than 1 mol %. It is to be noted that the percentage content of the monomer unit that includes an alkyl group having 5 to 29 carbon atoms as referred to herein means a proportion of number of moles of the monomer unit that includes an alkyl group having 5 to 29 carbon atoms with respect to the number of moles of the entire structural units constituting the alkyl-modified PVA.

When the percentage content of the monomer unit that includes an alkyl group having 5 to 29 carbon atoms exceeds 5 mol %, a proportion of hydrophobic groups included per molecule of the alkyl-modified PVA is so high that water solubility of the alkyl-modified PVA is deteriorated. On the other hand, when the content of the monomer unit that includes an alkyl group having 5 to 29 carbon atoms is less than 0.05 mol %, although water solubility of the alkyl-modified PVA is superior, the number of alkyl groups included in the alkyl-modified PVA is so small that physical properties such as high viscosity owing to modification with an alkyl are not attained.

The percentage content of the monomer unit that includes an alkyl group having 5 to 29 carbon atoms may be determined from proton NMR of an alkyl-modified vinyl ester polymer that is a precursor of the alkyl-modified PVA. Specifically, a sample for analysis is produced by reprecipitation and purification of the alkyl-modified vinyl ester polymer with n-hexane/acetone sufficiently carried out at least three times, followed by drying at 50° C. under a reduced pressure for 2 days. This sample is dissolved in $CDCl_3$, and the content is measured using proton NMR at 500 MHz (JEOL GX-500) at room temperature.

In this process, for example, when the alkyl-modified vinyl ester polymer does not include the alkyl-modified monomer unit other than the monomer unit represented by the above formula (IV), and $R^3$ is linear and $R^4$ represents a hydrogen atom, the percentage content may be determined according to the following method. More specifically, the percentage content S of the monomer unit S represented by the above formula (IV) is calculated from peak α (4.7 to 5.2 ppm) derived from main chain methine of the alkyl-modified vinyl ester polymer, and peak β (0.8 to 1.0 ppm) derived from an end methyl group of the alkyl group $R^3$, using the following formula:

$S(\text{mol \%}) = \{(\text{number of β proton}/3)/(\text{number of α proton} + (\text{number of β proton}/3))\} \times 100$ The viscosity average degree of polymerization of the alkyl-modified PVA contained in the alkyl-modified PVA solution is preferably no less than 200 and no greater than 5,000, more preferably no less than 500 and no greater than 4,000, and more preferably no less than 1,000 and no greater than 3,000. It is to be noted that the viscosity average degree of polymerization may be merely referred to as "degree of polymerization". When the degree of polymerization exceeds 5,000, productivity of the alkyl-modified PVA may be lowered. To the contrary, when the degree of polymerization is less than 200, the gelation ability at low temperatures of the alkyl-modified PVA solution is deteriorated, and thus sufficient gelation ability may not be achieved.

The viscosity average degree of polymerization (P) is measured in accordance with JIS-K6726: 1994. More specifically, after the alkyl-modified PVA is resaponified and purified, limiting viscosity [η] (unit: deciliter/g) is measured in water at 30° C. to determine the viscosity average degree of polymerization according to the following formula:

$P = ([\eta] \times (10^3/8.29))^{(1/0.62)}$

The degree of saponification of the alkyl-modified PVA contained in the alkyl-modified PVA solution is no less than 20 mol % and no greater than 99.99 mol %, preferably no less than 40 mol % and no greater than 99.95 mol %, and more preferably no less than 50 mol % and no greater than 99.9 mol %. When the degree of saponification is less than 20 mol %, water solubility and/or the gelation ability at low temperatures may be deteriorated. To the contrary, the degree of saponification exceeding 99.99 mol % leads to a loss of practicability due to a difficulty in production of the alkyl-modified PVA. Note that the degree of saponification of the alkyl-modified PVA is measured in accordance with JIS-K6726: 1994.

The concentration of the alkyl-modified PVA in the alkyl-modified PVA solution is not particularly limited, and preferably no less than 0.5% by mass and no greater than 50% by mass, more preferably no less than 1% by mass and no greater than 30% by mass, and still more preferably no less than 2% by mass and no greater than 20% by mass. In addition, according to the alkyl-modified PVA solution, even when the concentration of the alkyl-modified PVA is increased, elevation of viscosity at high temperatures can be inhibited, leading to superior handleability. Therefore, the concentration of the alkyl-modified PVA may be, for example, no less than 5% by mass and no greater than 20% by mass.

Production Method of Alkyl-Modified PVA

Although a method for producing the alkyl-modified PVA is not particularly limited, a method including: copolymerizing an unsaturated monomer represented by the following formula (V) with a vinyl ester monomer; and saponifying thus obtained alkyl-modified vinyl ester polymer (copolymer) is preferred. When the alkyl-modified PVA contained in the alkyl-modified PVA solution is obtained by saponifying the copolymer of the above specific monomers, adjustment of the degree of saponification of the alkyl-modified PVA and the like can be facilitated, and viscosity controllability and the like can be further improved. In addition, miscibility with water is even further improved, and thus a solution that is superior in practical applicability can be prepared. In this process, the copolymerization is preferably carried out in an alcohol solvent or in the absence of a solvent.

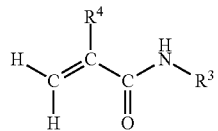

(V)

In the above formula (V), $R^3$ and $R^4$ are as defined in connection with the above formula (IV).

Examples of the unsaturated monomer represented by the above formula (V) include N-octylacrylamide, N-decylacrylamide, N-dodecylacrylamide, N-octadecylacrylamide, N-hexacosylacrylamide, N-octylmethacrylamide, N-decylmethacrylamide, N-dodecylmethacrylamide, N-octadecylmethacrylamide, N-hexacosylmethacrylamide, and the like. Of these, N-octadecylacrylamide, N-octylmethacrylamide, N-decylmethacrylamide, N-dodecylmethacrylamide, N-octadecylmethacrylamide and N-hexacosylmethacrylamide are preferred, N-octadecylacrylamide, N-dodecylmethacrylamide and N-octadecylmethacrylamide are more preferred, and N-octadecylacrylamide and N-octadecylmethacrylamide are still more preferred.

Examples of the vinyl ester monomer include vinyl formate, vinyl acetate, vinyl propionate, vinyl butyrate, vinyl isobutyrate, vinyl pivalate, vinyl versatate, vinyl caprate, vinyl caprylate, vinyl laurate, vinyl palmitate, vinyl stearate, vinyl oleate, vinyl benzoate, and the like. Of these, vinyl acetate is preferred.

Upon copolymerization of the unsaturated monomer represented by the above formula (V) with the vinyl ester monomer, other monomer may be copolymerized within a range not leading to impairment of principles of the present invention. Examples of the other monomer which may be used include α-olefins such as ethylene, propylene, n-butene and isobutylene;

vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, nonyl vinyl ether, dodecyl vinyl ether and octadecyl vinyl ether;

nitriles such as acrylonitrile and methacrylonitrile;

halogenated vinyls such as vinyl chloride and vinyl fluoride;

halogenated vinylidenes such as vinylidene chloride and vinylidene fluoride;

allyl compounds such as allyl acetate, 2,3-diacetoxy-1-allyloxypropane and allyl chloride;

vinylsilyl compounds such as vinyltrimethoxysilane;

isopropenyl acetate, and the like.

In addition, upon copolymerization of the unsaturated monomer represented by the above formula (V) with the vinyl ester monomer, a chain transfer agent may be added within a range not leading to impairment of principles of the present invention, for the purpose of adjusting the degree of polymerization of the resultant copolymer. Examples of the chain transfer agent include:

aldehydes such as acetaldehyde and propionaldehyde;

ketones such as acetone and methyl ethyl ketone;

mercaptans such as 2-hydroxyethanethiol;

halogenated hydrocarbons such as trichloroethylene and perchloroethylene;

phosphinic acid salts such as sodium phosphinate monohydrate, and the like. Of these, aldehydes and ketones are preferred.

The amount of the chain transfer agent added may be decided in accordance with a chain transfer constant of a chain transfer agent added as well as the degree of polymerization of a target alkyl-modified vinyl ester polymer, and in turn the degree of polymerization of the alkyl-modified PVA. The amount of the chain transfer agent is preferably no less than 0.1% by mass and no greater than 10% by mass with respect to the vinyl ester monomer, in general.

The temperature employed during the copolymerization of the unsaturated monomer represented by the above formula (V) with the vinyl ester monomer is preferably 0° C. to 200° C., and more preferably 30° C. to 140° C. When the temperature employed during the copolymerization is lower than 0° C., a sufficient polymerization rate is less likely to be obtained. In contrast, when the temperature employed during carrying out the polymerization is higher than 200° C., the alkyl-modified PVA that satisfies the percentage content of the monomer unit that includes the alkyl group defined according to the aspect of the present invention is not likely to be obtained. The method for controlling the temperature employed during carrying out the copolymerization to be 0° C. to 200° C. is exemplified by a method including, for example, controlling a polymerization rate to make a balance between heat generation resulting from the polymerization reaction, and heat dissipation from the surface of the reaction vessel, as well as a method including controlling by an external jacket using an appropriate heating medium, and the like. Of these methods, a method including controlling by an external jacket using an appropriate heating medium is preferred in light of safety.

With respect to the polymerization process, which may be adopted for carrying out the copolymerization of the unsaturated monomer represented by the above formula (V) with the vinyl ester monomer, e.g., batchwise polymerization, semi-batchwise polymerization, continuous polymerization, semi-continuous polymerization, and the like are exemplified. As the polymerization method, a well-known method such as, for example, a bulk polymerization method, a solution polymerization method, a suspension polymerization method or an emulsion polymerization method may be used. Of these, a bulk polymerization method carried out in the absence of a solvent, or a solution polymerization method in an alcohol solvent may be suitably employed, whereas when production of a copolymer having a high degree of polymerization is intended, an emulsion polymerization method may be employed.

Examples of the alcohol solvent which may be used include methanol, ethanol, n-propanol and the like, but not limited thereto. Also, these solvents may be used as a mixture of two or more types thereof.

As an initiator for use in copolymerization of the unsaturated monomer represented by the above formula (V) with the vinyl ester monomer, a conventionally well-known azo initiator, peroxide initiator, redox initiator or the like may be used in accordance with the polymerization method.

Examples of the azo initiator include 2,2'-azobisisobutyronitrile, 2,2'-azobis(2,4-dimethylvaleronitrile), 2,2'-azobis(4-methoxy-2,4-dimethylvaleronitrile), and the like.

Examples of the peroxide initiator include:

percarbonate compounds such as diisopropyl peroxydicarbonate, di-2-ethylhexyl peroxydicarbonate and diethoxyethyl peroxydicarbonate;

perester compounds such as t-butyl peroxyneodecanate, α-cumyl peroxyneodecanate and t-butyl peroxydecanate;

acetylcyclohexylsulfonyl peroxide, 2,4,4-trimethylpentyl-2-peroxyphenoxy acetate, and the like. Furthermore, the initiator may be prepared as a combination with potassium persufate, ammonium persulfate, hydrogen peroxide or the like.

The redox initiator is exemplified by a combination of the aforementioned peroxide with a reducing agent such as sodium bisulfite, sodium bicarbonate, tartaric acid, L-ascorbic acid or Rongalit.

It is to be noted that when the copolymerization of the unsaturated monomer represented by the above formula (V) with the vinyl ester monomer is carried out at high temperatures, coloring and the like of PVA resulting from degradation of the vinyl ester monomer may be found. In such cases, it is preferred that an antioxidant such as tartaric acid be added to a polymerization system for the purpose of preventing coloring in an amount of about 1 to 100 ppm with respect to the vinyl ester monomer.

The alkyl-modified vinyl ester copolymer obtained by the copolymerization may be subjected to an alcoholysis reaction or a hydrolysis reaction using a basic catalyst such as sodium hydroxide, potassium hydroxide or sodium methoxide or an acidic catalyst such as p-toluenesulfonic acid that is well known.

Examples of the solvent which may be used for the saponification reaction include alcohols such as methanol and ethanol; esters such as methyl acetate and ethyl acetate; ketones such as acetone and methylethylketone; aromatic hydrocarbons such as benzene and toluene, and the like. It is to be noted that these solvents may be used either alone, or in combination of two or more thereof.

As the saponification reaction, a method carried out using a solvent such as methanol, or a methanol/methyl acetate mixture, with sodium hydroxide as a catalyst is preferred due to convenience.

Surfactant

The surfactant contained in the alkyl-modified PVA solution is a compound represented by the following formula (I).

$$X^1-O-(R^1-O-)_m R^2-X^2 \qquad (I)$$

In the above formula (I), $R^1$ represents an alkylene group having 3 to 5 carbon atoms; $R^2$ represents a single bond or an alkylene group having 1 to 5 carbon atoms; $X^1$ represents a hydrogen atom or an organic group; $X^2$ represents a hydrophilic group; and m is an integer of 1 to 100, wherein provided that m is at least 2, $R^1$s present in a plurality of number are each independently as defined above.

The surfactant is superior in compatibility with the aforementioned specific alkyl-modified PVA and water, and enables a solution having a high concentration to be prepared without causing phase separation. In addition, the surfactant can inhibit a hydrophobic interaction of alkyl groups included in the specific alkyl-modified PVA at high temperatures, whereas it can accelerate the interaction at low temperatures. Although the reason for achieving such effects has not been sufficiently elucidated, it is speculated that, for example, the alkyleneoxy group having 3 to 5 carbon atoms may exhibit hydrophobicity in an aqueous solution at high temperatures, whereas hydrophilicity is exhibited at low temperatures. Accordingly, due to containing the surfactant, the alkyl-modified PVA solution exhibits: a behavior involving low viscosity at high temperatures leading to superior handleability; and an abrupt increase of the viscosity at low temperatures to cause gelation at low temperatures. In other words, the alkyl-modified PVA solution can exhibit behaviors similar to those of a PVA-boric acid crosslinking solution.

The hydrophilic group which may be represented by $X^2$ is preferably a carboxyl group or a salt thereof, a sulfonic acid group or a salt thereof, or a group represented by the following formula (II). In this regard, examples of a counter cation in the salt of the carboxyl group or the salt of the sulfonic acid group include alkali metal cations such as sodium and potassium; alkaline earth metal cations such as calcium and barium; an ammonium ion, and the like. When $X^2$ represents such a specific hydrophilic group, handleability at high temperatures, and gelation behavior at low temperatures of the alkyl-modified PVA solution are even further improved. Of these, $X^2$ represents preferably a sulfonic acid group or a salt thereof, or a group represented by the following formula (II), and more preferably a group represented by the following formula (II).

$$-(-CH_2CH_2O-)_{n1}H \qquad (II)$$

In the above formula (II), n1 is an integer of 1 to 200. The group represented by the above formula (II) may have other monomer unit such as a propyleneoxy group in small amount within a range not leading to impairment of principles of the present invention.

"n1" is preferably an integer of 2 to 100, more preferably an integer of 2 to 40, and still more preferably an integer of 3 to 20.

The organic group which may be represented by $X^1$ is preferably an alkyl group having 1 to 29 carbon atoms or a hydrophilic group. When $X^1$ represents such a specific group, the state of a solution, and the gelation behavior at low temperatures of the alkyl-modified PVA solution are even further improved. Of these, $X^1$ represents more preferably a hydrogen atom, an alkyl group having 1 to 18 carbon atoms or a hydrophilic group, even more preferably a hydrogen atom, an alkyl group having 1 to 10 carbon atoms or a hydrophilic group, and particularly preferably a hydrophilic group.

The hydrophilic group which may be represented by $X^1$ is preferably a group represented by the following formula (III). When $X^1$ represents such a specific hydrophilic group, handleability at high temperatures, and the gelation behavior at low temperatures are even further improved. Of these, a group represented by the following formula (III) is more preferred.

$$H-(-OCH_2CH_2-)_{n2} \qquad (III)$$

In the above formula (III), n2 is an integer of 1 to 200. The group represented by the above formula (III) may include other monomer unit such as a propyleneoxy group in a small amount within a range not leading to impairment of principles of the present invention.

"n2" is preferably an integer of 2 to 100, more preferably an integer of 2 to 40, and still more preferably an integer of 3 to 20.

Examples of the alkylene group having 3 to 5 carbon atoms which may be represented by $R^1$ include a propanediyl group, a butanediyl group, and a pentanediyl group. Of these, in light of appropriate hydrophobicity of the surfactant, a propanediyl group and a butanediyl group are preferred, and a propanediyl group is more preferred.

Examples of the alkylene group having 1 to 5 carbon atoms which may be represented by $R^2$ include a methylene group, an ethanediyl group, a propanediyl group, and the like. It is to be noted that $R^2$ is preferably a single bond.

Further, m is preferably an integer of 2 to 60, more preferably an integer of 2 to 50, and still more preferably an integer of 3 to 30.

Although the surfactant is not particularly limited as long as it is a compound represented by the above formula (I), examples thereof include:

diblock copolymers such as polyethylene glycol-polypropylene glycol, polyethylene glycol-polytetramethylene glycol, polyethylene glycol-polybutylene glycol, and polyethylene glycol-polypentylene glycol;

triblock copolymers such as polyethylene glycol-polypropylene glycol-polyethylene glycol, polyethylene glycol-polytetramethylene glycol-polyethylene glycol, polyethylene glycol-polybutylene glycol-polyethylene glycol, and polyethylene glycol-polypentylene glycol-polyethylene glycol;

polypropylene glycol-sulfuric acid ester sodium salts, polytetramethylene glycol-sulfuric acid ester sodium salts, polybutylene glycol-sulfuric acid ester sodium salts, and polypentylene glycol-sulfuric acid ester sodium salts;

polyethylene glycol-polypropylene glycol-alkyl ether, and the like.

Of these, in light of even further improvement of superior handleability at high temperatures and superior gelation ability at low temperatures of the above specific solution owing to the alkyl-modified PVA, diblock copolymers of polyethylene glycol-polypropylene glycol and triblock copolymers of polyethylene glycol-polypropylene glycol-polyethylene glycol are preferred, and triblock copolymers of polyethylene glycol-polypropylene glycol-polyethylene glycol are more preferred.

The mass ratio of the surfactant to water contained in the alkyl-modified PVA solution (mass of the surfactant/mass of water) is preferably no less than 1/99 and no greater than 40/60, more preferably no less than 3/97 and no greater than 50/50, still more preferably no less than 5/95 and no greater than 30/70, and particularly preferably no less than 10/90 and no greater than 20/80. When mass ratio of the surfactant to water falls within the above range, the alkyl-modified PVA solution enables handleability at high temperatures and the gelation behavior at low temperatures to be even further improved. When the mass ratio is less than 1/99, elevation of the viscosity at low temperatures may be too remarkable. To the contrary, when the mass ratio exceeds 40/60, solubility of the alkyl-modified PVA may be decreased.

Optional Components

Additives

In addition to the alkyl-modified PVA, the specific surfactant and water, the alkyl-modified PVA solution may contain various types of additives such as a plasticizer, a defoaming agent, an ultraviolet ray absorbing agent, a filler, a pH adjusting agent and a water proofing agent within a range not leading to impairment of principles of the present invention.

Other Water Soluble Polymer

The alkyl-modified PVA solution may contain well-known various types of PVA other than the alkyl-modified PVA contained in the alkyl-modified PVA solution, as well as other water soluble polymer such as starch, carboxymethyl cellulose, methyl cellulose, hydroxymethyl cellulose, hydroxyethyl cellulose and hydroxypropyl cellulose within a range not leading to impairment of principles of the present invention. The amount of the other water soluble polymer blended is preferably no greater than 50 parts by mass with respect to 100 parts by mass of the alkyl-modified PVA contained in the alkyl-modified PVA solution.

The viscosity at 20° C. of the alkyl-modified PVA solution is preferably no less than 10,000 (mPa·s), more preferably no less than 100,000 (mPa·s), and still more preferably no less than 250,000 (mPa·s). The alkyl-modified PVA solution particularly preferably has a gelled state at 20° C.

The viscosity at 60° C. of the alkyl-modified PVA solution is preferably less than 15,000 (mPa·s), and more preferably less than 10,000 (mPa·s).

The viscosity ratio of the viscosity at 20° C. to the viscosity at 60° C. (viscosity at 20° C./viscosity at 60° C.) of the alkyl-modified PVA solution is preferably no less than 25, and more preferably no less than 100. Accordingly, the viscosity ratio is preferably as great as possible in light of the gelation at low temperatures, and it is most preferred that the alkyl-modified PVA solution is gelatinous at 20° C.

Preparation Method of Alkyl-Modified PVA Solution

The alkyl-modified PVA solution may be prepared by mixing the alkyl-modified PVA, the surfactant and water, and as needed optional components at a certain ratio. Although the method for mixing these components is not particularly limited, exemplary methods may include: adding the alkyl-modified PVA to a mixture of the surfactant and water; or adding the surfactant to the aqueous alkyl-modified PVA solution. It is to be noted that the method for mixing may further include stirring with heating in order to improve the solubility. When the heating of the solution is carried out, the temperature employed may be, for example, no less than 80° C. and no greater than 95° C.

Application of Alkyl-Modified PVA Solution

According to the alkyl-modified PVA solution, even in a case in which the solution contains the alkyl-modified PVA at a high concentration, elevation of viscosity at high temperatures is inhibited, leading to superior handleability, whereas the viscosity is rapidly elevated at low temperatures to result in the superior gelation ability at low temperatures achieved. Therefore, the alkyl-modified PVA solution can be suitably used as a solution gelled at low temperatures that is superior in safety and that may be an alternative to PVA-boric acid crosslinking solutions. Accordingly, the alkyl-modified PVA solution can be suitably used as a temperature-sensitive binder, a gelation agent, a temperature-sensitive adhesive, a thickening agent, and the like. Specifically, the alkyl-modified PVA solution can be used as a component constituting: coating agents for papers; internal sizing agents for papers; fiber coating agents; dyes; coating agents for glass fibers; surface coating agents for metals and glass; coating materials such as anti-fogging agents; adhesives for woods, papers, aluminum foils, plastics and the like; binders for nonwoven fabrics; fibrous binders; binders for building materials such as gypsum boards and fiberboards; thickening agents for various types of emulsion adhesives; additives for urea resin adhesives; additives for cement and mortar; various types of adhesives such as hot melt adhesives and pressure-sensitive adhesives; dispersants for emulsion polymerization of various types of ethylenic unsaturated monomers such as ethylene, vinyl acetate and vinyl chloride; stabilizers for dispersing a pigment in paints, adhesives and the like; dispersion stabilizers for suspension polymerization of various types of ethylenic unsaturated monomers such as vinyl chloride, vinylidene chloride, styrene, (meth)acrylic acids and vinyl acetate; molded articles such as fibers, films, sheets, pipes, tubes, water-soluble fibers and temporary coating films; agents for imparting hydrophilicity to hydrophobic resins; soil conditioners, soil stabilizers, and the like.

EXAMPLES

Hereinafter, the present invention will be explained in detail by way of Examples and Comparative Examples. In the following Examples and Comparative Examples, "part" and "%" are on mass basis unless otherwise specified particularly.

With regard to PVA obtained in the following Production Examples (alkyl-modified PVA and unmodified PVA), evaluations were made in accordance with the following method.

Percentage Modification

The percentage modification of each PVA (percentage content of the monomer unit that includes the alkyl group in PVA) was determined according to a method using the proton NMR described above.

Degree of Polymerization

The viscosity average degree of polymerization of each PVA was determined according to a method of JIS-K6726: 1994.

Degree of Saponification

The degree of saponification of each PVA was determined according to a method of JIS-K6726: 1994.

Production of PVA

Production Example 1

Production of PVA1

Into a 3 L reaction vessel equipped with a stirrer, a reflux condenser, a nitrogen inlet tube, a comonomer dripping port and an addition port of the initiator were charged 750 g of vinyl acetate, 250 g of methanol and 1.1 g of N-octadecylmethacrylamide, and replacement with nitrogen gas in the system was carried out for 30 min by nitrogen bubbling. Also, a comonomer solution was prepared as a delay solution by dissolving N-octadecylmethacrylamide in methanol to give a concentration of 5%, and subjected to replacement with nitrogen by bubbling of nitrogen gas. An elevation of the temperature of the reaction vessel was started, and 0.25 g of 2,2'-azobisisobutyronitrile (AIBN) was added to initiate the polymerization when an internal temperature of 60° C. was attained. The polymerization was allowed to proceed at 60° C. for 3 hours while adding the delay solution dropwise such that the monomer composition in the polymerization solution (proportions of vinyl acetate and N-octadecylmethacrylamide) was kept constant, followed by cooling to stop the polymerization. The total amount of the comonomer (N-octadecylmethacrylamide) used (i.e., charged and added) was 4.8 g. In addition, the solid content concentration was 29.9% when the polymerization was stopped. Subsequently, unreacted vinyl acetate monomer was eliminated while adding methanol at 30° C. under a reduced pressure at intervals to obtain a methanol solution (concentration: 35%) of the alkyl-modified vinyl ester polymer (alkyl-modified PVAc). Furthermore, saponification was carried out by adding 27.9 g of an alkali solution (10% methanol solution of sodium hydroxide) to 771.4 g of a methanol solution of the alkyl-modified PVAc (alkyl-modified PVAc in the solution: 200.0 g) prepared by adding methanol to the resulting methanol solution obtained above. In this procedure, the concentration of the alkyl-modified PVAc in the saponification solution was 25%, and the molar ratio of sodium hydroxide to the vinyl acetate unit in the alkyl-modified PVAc was 0.03. Since gelatinous matter was produced about 1 min after the alkali solution was added, the gelatinous matter was ground with a grinder, and left to stand at 40° C. for 1 hour to allow the saponification to proceed. Thereafter, 500 g of methyl acetate was added to neutralize remaining alkali. After confirming the completion of the neutralization using a phenolphthalein indicator, the mixture was filtered to obtain a white solid. Methanol in an amount of 2,000 g was added to the white solid, and the mixture was left to stand at room temperature for 3 hours to permit washing. After this washing operation was repeated three times, a white solid obtained by deliquoring through centrifugation was left to stand in a dryer at 65° C. for 2 days to obtain alkyl-modified PVA (PVA1).

Production Examples 2 to 18

Production of PVA2 to PVA18

Various types of alkyl-modified PVAs (PVA2 to PVA18) were produced in a similar manner to Example 1 except that: polymerization conditions such as the amount of vinyl acetate and methanol charged, and the type and amount of addition of the unsaturated monomer having an alkyl group used in polymerization; and saponification conditions such as the concentration of alkyl-modified PVAc and the molar ratio of sodium hydroxide to the vinyl acetate unit in saponification were changed as shown in Table 1.

Production Example 19

Production of PVA19

Into a 3 L reaction vessel equipped with a stirrer, a reflux condenser, a nitrogen inlet tube and an addition port of the initiator were charged 750 g of vinyl acetate, 250 g of methanol and 57.3 g of octadecyl vinyl ether, and replacement with nitrogen gas in the system was carried out for 30 min by nitrogen bubbling. An elevation of the temperature of the reaction vessel was started, and 1.0 g of 2,2'-azobisisobutyronitrile (AIBN) was added to initiate the polymerization when an internal temperature of 60° C. was attained. The polymerization was allowed to proceed at 60° C. for 2 hours, followed by cooling to stop the polymerization. The solid content concentration was 30.4% when the polymerization was stopped. Subsequently, unreacted vinyl acetate monomer was eliminated while adding methanol at 30° C. under a reduced pressure at intervals to obtain a methanol solution (concentration: 35%) of the alkyl-modified vinyl ester polymer (alkyl-modified PVAc). Furthermore, saponification was carried out by adding 7.0 g of an alkali solution (10% methanol solution of sodium hydroxide) to 792.9 g of a methanol solution of the alkyl-modified PVAc (alkyl-modified PVAc in the solution: 200.0 g) prepared by adding methanol to the resulting methanol solution obtained above. In this procedure, the concentration of the alkyl-modified PVAc in the saponification solution was 25%, and the molar ratio of sodium hydroxide to the vinyl acetate unit in the alkyl-modified PVAc was 0.0075. Since gelatinous matter was produced about 12 min after the alkali solution was added, the gelatinous matter was ground with a grinder, and left to stand at 40° C. for 1 hour to allow the saponification to proceed. Thereafter, 500 g of methyl acetate was added to neutralize remaining alkali. After confirming the completion of the neutralization using a phenolphthalein indicator, the mixture was filtered to obtain a white solid. Methanol in an amount of 2,000 g was added to the white solid, and the mixture was left to stand at room temperature for 3 hours to permit washing. After this washing operation was repeated three times, a white solid obtained by deliquoring through centrifugation was left to stand in a dryer at 65° C. for 2 days to obtain alkyl-modified PVA (PVA19).

Production Example 20

Production of PVA20

Into a 3 L reaction vessel equipped with a stirrer, a reflux condenser, a nitrogen inlet tube and an addition port of the initiator were charged 900 g of vinyl acetate and 100 g of methanol, and replacement with nitrogen gas in the system was carried out for 30 min by nitrogen bubbling. An elevation of the temperature of the reaction vessel was started, and 0.25 g of 2,2'-azobisisobutyronitrile (AIBN) was added to initiate the polymerization when an internal temperature of 60° C. was attained. The polymerization was allowed to proceed at 60° C. for 3 hours, followed by cooling to stop the polymerization. The solid content concentration was 31.0% when the polymerization was stopped. Subsequently, unreacted vinyl acetate monomer was eliminated while adding methanol at 30° C. under a reduced pressure at intervals to obtain a methanol solution (concentration: 30%) of the polyvinyl acetate (PVAc). Furthermore, saponification was carried out by adding 27.9 g of an alkali solution (10% methanol solution of sodium hydroxide) to 971.1 g of a methanol solution of the PVAc (PVAc in the solution: 200.0 g) prepared by adding methanol to the resulting methanol solution obtained above. In this procedure, the concentration of the PVAc in the saponification solution was 20%, and the molar ratio of sodium hydroxide to the vinyl acetate unit in the PVAc was 0.03. Since gelatinous matter was produced about 1 min after the alkali solution was added, the gelatinous matter was ground with a grinder, and left to stand at 40° C. for 1 hour to allow the saponification to proceed. Thereafter, 500 g of methyl acetate was added to neutralize remaining alkali. After confirming the completion of the neutralization using a phenolphthalein indicator, the mixture was filtered to obtain a white solid. Methanol in an amount of 2,000 g was added to the white solid, and the mixture was left to stand at room temperature for 3 hours to permit washing. After this washing operation was repeated three times, a white solid obtained by deliquoring through centrifugation was left to stand in a dryer at 65° C. for 2 days to obtain unmodified PVA (PVA20).

TABLE 1

| | | Amount[1] | | | | Conversion | Saponification conditions | |
| | | vinyl acetate | methanol | unsaturated monomer | | rate by polymerization | PVAc concentration | NaOH molar ratio[2] |
| | PVA | (g) | (g) | type[3] R$^3$ | R$^4$ | amount (g) | (%) | (%) | |
|---|---|---|---|---|---|---|---|---|---|
| Production Example 1 | PVA1 | 750 | 250 | C$_{18}$H$_{37}$ | CH$_3$ | 4.8 | 40 | 25 | 0.03 |
| Production Example 2 | PVA2 | 850 | 150 | C$_{18}$H$_{37}$ | CH$_3$ | 4.9 | 30 | 25 | 0.03 |
| Production Example 3 | PVA3 | 900 | 100 | C$_{18}$H$_{37}$ | CH$_3$ | 4.9 | 30 | 20 | 0.03 |
| Production Example 4 | PVA4 | 400 | 600 | C$_{18}$H$_{37}$ | CH$_3$ | 3.4 | 50 | 30 | 0.03 |
| Production Example 5 | PVA5 | 100 | 900 | C$_{18}$H$_{37}$ | CH$_3$ | 1.1 | 50 | 40 | 0.03 |
| Production Example 6 | PVA6 | 750 | 250 | C$_{18}$H$_{37}$ | CH$_3$ | 4.8 | 40 | 25 | 0.0075 |
| Production Example 7 | PVA7 | 750 | 250 | C$_{18}$H$_{37}$ | CH$_3$ | 4.8 | 40 | 25 | 0.007 |
| Production Example 8 | PVA8 | 550 | 450 | C$_{18}$H$_{37}$ | CH$_3$ | 3.6 | 40 | 25 | 0.005 |
| Production Example 9 | PVA9 | 400 | 600 | C$_{18}$H$_{37}$ | CH$_3$ | 3.4 | 50 | 30 | 0.002 |
| Production Example 10 | PVA10 | 750 | 250 | C$_{18}$H$_{37}$ | CH$_3$ | 1.2 | 40 | 25 | 0.0078 |
| Production Example 11 | PVA11 | 750 | 250 | C$_{12}$H$_{25}$ | CH$_3$ | 12.0 | 40 | 25 | 0.007 |
| Production Example 12 | PVA12 | 750 | 250 | C$_8$H$_{17}$ | CH$_3$ | 19.3 | 40 | 25 | 0.0068 |
| Production Example 13 | PVA13 | 750 | 250 | C$_8$H$_{17}$ | CH$_3$ | 42.1 | 40 | 25 | 0.006 |
| Production Example 14 | PVA14 | 750 | 250 | C$_5$H$_{11}$ | CH$_3$ | 2.4 | 40 | 25 | 0.03 |
| Production Example 15 | PVA15 | 750 | 250 | C$_{10}$H$_{21}$ | CH$_3$ | 3.6 | 40 | 25 | 0.03 |
| Production Example 16 | PVA16 | 750 | 250 | C$_{26}$H$_{53}$ | CH$_3$ | 7.1 | 40 | 25 | 0.03 |
| Production Example 17 | PVA17 | 750 | 250 | C$_{30}$H$_{61}$ | CH$_3$ | 8.2 | 40 | 25 | 0.03 |
| Production Example 18 | PVA18 | 750 | 250 | C$_{18}$H$_{37}$ | H | 4.8 | 40 | 25 | 0.0075 |
| Production Example 19 | PVA19 | 750 | 250 | octadecyl vinyl ether | | 57.3 | 40 | 25 | 0.0075 |
| Production Example 20 | PVA20 | 900 | 100 | — | | | 35 | 20 | 0.03 |

[1]In Production Example 19, 1.0 g of 2,2'-azobisisobutyronitrile(AIBN) was used as a polymerization initiator. In other Production Examples, 0.25 g of AIBN was used.
[2]Molar ratio of sodium hydroxide (NaOH) to the vinyl acetate unit in alkyl-modified PVAc.
[3]Showing groups represented by R$^3$ and R$^4$ in the unsaturated monomer represented by the general formula (V) used in the polymerization.

Example 1

To a mixture of 9 g of a triblock copolymer of polyethylene glycol-polypropylene glycol-polyethylene glycol (a compound shown in Table 2 as surfactant A represented by the formula (I)) as the surfactant, and 81 g of distilled water, with a mass ratio (mass of the surfactant/mass of water) being 10/90, 10 g of PVA1 was added at room temperature, and the mixture was stirred using an agitator for 30 min. Next, the temperature of this solution was elevated to 90° C. with stirring, and the solution was further stirred as is for 1 hour, followed by cooling to room temperature to obtain a PVA solution containing PVA1 at a concentration of 10% by mass. The PVA solution thus obtained was evaluated on solubility and solution properties (viscosity at 20° C., viscosity at 60° C. and handleability at 60° C., and viscosity ratio of viscosity at 20° C. to viscosity at 60° C.) according to the following methods. The results are shown in Table 3.

Evaluation of Solubility

The state of the PVA solution was visually observed, and the evaluation was made in accordance with the following criteria. Note that when the evaluation was made as any of A to C, it is concluded that the practical applicability is superior.

A: a transparent solution;
B: a somewhat turbid solution;
C: a white turbid solution; and
D: a solution including undissolved matter;

Evaluation of Solution

Viscosity at 20° C., Viscosity at 60° C. and Handleability at 60° C.

Using a BH type viscometer, viscosity (mPa·s) of the PVA solution was measured under conditions involving a rotation frequency of 2 rpm, at 20° C. and 60° C. Furthermore, handleability at 60° C. was determined in accordance with the following criteria. Note that when the evaluation was made as any of A or B, it is concluded that the practical applicability is found.

A: viscosity at 60° C. being no less than 1 mPa·s and less than 10,000 mPa·s;
B: viscosity at 60° C. being no less than 10,000 mPa·s and less than 15,000 mPa·s;
C: viscosity at 60° C. being no less than 15,000 mPa·s and less than 20,000 mPa·s;
D: viscosity at 60° C. being no less than 20,000 mPa·s
E: undissolved matter being included Viscosity Ratio of Viscosity at 20° C. to Viscosity at 60° C.

Gelation ability at low temperatures was determined from a value derived by dividing the viscosity at 20° C. by the viscosity at 60° C. of the PVA solution, in accordance with the following criteria. Note that when the evaluation was made as any of A to C, it is concluded that the gelation ability at low temperatures is superior.

A: gelling at 20° C. (viscosity being no less than 1,000,000 mPa·s)
B: 100≤viscosity at Viscosity at 20° C./viscosity at 60° C.
C: 25≤viscosity at 20° C./viscosity at 60° C.<100
D: 10≤Viscosity at 20° C./viscosity at 60° C.<25
E: viscosity at 20° C./viscosity at 60° C.<10
F: undissolved matter being included at 60° C.

Examples 2 to 23, and Comparative Examples 1 to 11

PVA solutions containing each PVA at a concentration of 10% by mass were prepared by a similar operation to Example 1 except that types of PVA and the surfactant used, and the mass ratio of the surfactant to water were changed as shown in Table 3. The resultant each PVA solution was evaluated on solubility and solution properties according to a method similar to that of Example 1. The types of the surfactant used are shown in Table 2, and the results are shown in Table 3. Note that surfactants A to E shown in Table 2 are those represented by the formula (I). In addition, the denotation "–" in Table 3 indicates that evaluation failed due to the presence of undissolved matter with respect to the viscosity of a 4% aqueous solution, and the viscosity at 20° C. and the viscosity at 60° C., whereas with respect to the percentage modification, the type of the surfactant, and the surfactant/water (mass ratio), the denotation "–" in Table 3 indicates that corresponding component was not added.

TABLE 2

| | | formula (I) | | | | formula (II)[2] | formula (III)[3] |
|---|---|---|---|---|---|---|---|
| Surfactant | $R^1$ | $R^2$ | $X^1$ | $X^2$ | m | n1 | n2 |
| A | $CH_2CH(CH_3)$ | single bond | $H\text{-}(OCH_2CH_2)_{n2}\text{-}$ | $\text{-}(CH_2CH_2O)_{n1}\text{-}H$ | 18 | 6 | 6 |
| B | $CH_2CH(CH_3)$ | single bond | H | $\text{-}(CH_2CH_2O)_{n1}\text{-}H$ | 2 | 12 | — |
| C | $CH_2CH_2CH_2CH_2$ | single bond | $H\text{-}(OCH_2CH_2)_{n2}\text{-}$ | $\text{-}(CH_2CH_2O)_{n1}\text{-}H$ | 12 | 6 | 6 |
| D | $CH_2CH(CH_3)$ | single bond | H | $SO_3Na$ | 20 | — | — |
| E | $CH_2CH(CH_3)$ | single bond | $C_8H_{17}$[1] | $\text{-}(CH_2CH_2O)_{n1}\text{-}H$ | 20 | 12 | — |
| F | | | isopropyl alcohol | | | | |
| G | | | propylene carbonate | | | | |
| H | | | PEG-300 | | | | |
| I | | | sodium dodecyl sulfate | | | | |

[1] linear alkyl group
[2] indicating n1 when $X^2$ in the formula (I) is a group represented by the general formula (II)
[3] indicating n2 when $X^1$ in the formula (I) is a group represented by the general formula (III)

TABLE 3

| | PVA | Polymerization results | | | Surfactant/ | | Solution evaluation | | | | |
|---|---|---|---|---|---|---|---|---|---|---|---|
| | | degree of polymerization | percentage modification (mol %) | degree of saponification (mol %) | Surfactant type | water (mass ratio) | Solubility evaluation | viscosity at 20° C.[1] (mPa · s) | viscosity at 60° C.[1] (mPa · s) | handleability at 60° C. | viscosity ratio |
| Example 1 | PVA1 | 1,700 | 0.4 | 98.5 | A | 10/90 | A | gel | 4,500 | A | A |
| Example 2 | PVA2 | 2,400 | 0.4 | 98.5 | A | 10/90 | A | gel | 7,500 | A | A |
| Example 3 | PVA3 | 3,000 | 0.4 | 98.5 | A | 10/90 | A | gel | 14,000 | B | A |
| Example 4 | PVA4 | 500 | 0.4 | 98.5 | A | 10/90 | A | 60,000 | 100 | A | B |
| Example 5 | PVA5 | 100 | 0.4 | 98.5 | A | 10/90 | A | 10,000 | 10 | A | B |
| Example 6 | PVA6 | 1,700 | 0.4 | 88 | A | 10/90 | A | gel | 3,300 | A | A |
| Example 7 | PVA7 | 1,700 | 0.4 | 80 | A | 10/90 | A | gel | 2,500 | A | A |
| Example 8 | PVA8 | 1,000 | 0.4 | 60 | A | 10/90 | A | gel | 1,000 | A | A |
| Example 9 | PVA10 | 1,700 | 0.08 | 88 | A | 10/90 | A | 200,000 | 400 | A | B |
| Example 10 | PVA11 | 1,700 | 1.2 | 88 | A | 10/90 | B | gel | 8,000 | A | A |
| Example 11 | PVA12 | 1,700 | 2.5 | 88 | A | 10/90 | B | gel | 5,000 | A | A |
| Example 12 | PVA14 | 1,700 | 0.4 | 98.5 | A | 10/90 | B | 10,000 | 400 | A | C |
| Example 13 | PVA15 | 1,700 | 0.4 | 98.5 | A | 10/90 | A | 100,000 | 1,000 | A | B |
| Example 14 | PVA16 | 1,700 | 0.4 | 98.5 | A | 10/90 | A | gel | 12,000 | B | A |
| Example 15 | PVA18 | 1,700 | 0.4 | 88 | A | 10/90 | A | gel | 3,000 | A | A |
| Example 16 | PVA19 | 1,700 | 0.8 | 88 | A | 10/90 | C | gel | 4,000 | A | A |
| Example 17 | PVA1 | 1,700 | 0.4 | 98.5 | B | 10/90 | B | gel | 7,000 | A | A |
| Example 18 | PVA1 | 1,700 | 0.4 | 98.5 | C | 10/90 | B | 200,000 | 4,000 | A | C |
| Example 19 | PVA1 | 1,700 | 0.4 | 98.5 | D | 10/90 | A | 200,000 | 4,000 | A | C |
| Example 20 | PVA1 | 1,700 | 0.4 | 98.5 | E | 10/90 | C | gel | 14,000 | B | A |
| Example 21 | PVA1 | 1,700 | 0.4 | 98.5 | A | 5/95 | A | gel | 14,000 | B | A |
| Example 22 | PVA1 | 1,700 | 0.4 | 98.5 | A | 20/80 | A | gel | 4,000 | A | A |
| Example 23 | PVA1 | 1,700 | 0.4 | 98.5 | A | 30/70 | A | 250,000 | 3,000 | A | C |
| Comparative Example 1 | PVA9 | 500 | 0.4 | 10 | A | 10/90 | D | — | — | E | F |
| Comparative Example 2 | PVA13 | 1,700 | 5.5 | 88 | A | 10/90 | D | — | — | E | F |
| Comparative Example 3 | PVA17 | 1,700 | 0.4 | 98.5 | A | 10/90 | B | gel | 22,000 | D | A |
| Comparative Example 4 | PVA20 | 3,000 | — | 98.5 | A | 10/90 | C | 25,000 | 11,000 | B | E |
| Comparative Example 5 | PVA1 | 1,700 | 0.4 | 98.5 | F | 10/90 | C | 41,000 | 4,000 | A | D |
| Comparative Example 6 | PVA1 | 1,700 | 0.4 | 98.5 | G | 10/90 | B | 43,000 | 12,000 | B | E |
| Comparative Example 7 | PVA1 | 1,700 | 0.4 | 98.5 | H | 10/90 | B | gel | 70,000 | D | A |
| Comparative Example 8 | PVA19 | 1,700 | 0.8 | 88 | H | 10/90 | C | gel | 65,000 | D | A |
| Comparative Example 9 | PVA1 | 1,700 | 0.4 | 98.5 | I | 10/90 | A | 5,000 | 3,500 | A | E |
| Comparative Example 10 | PVA1 | 1,700 | 0.4 | 98.5 | — | — | D | — | — | E | F |
| Comparative Example 11 | PVA20 | 3,000 | — | 98.5 | — | — | A | 8,000 | 800 | A | D |

[1] detection limit of the viscosity being 2,000,000 mPa · s

As shown in Table 3, the solutions of Examples 1 to 23 were, in spite of being solutions of PVA having an alkyl group having low water solubility, proven to be able to produce PVA solutions having a high PVA concentration of as high as 10%, superior in handleability at 60° C., accompanied by an abrupt increase in viscosity at 20° C., and be superior in a gelation ability at low temperatures. In addition, the solutions of Examples 1, 2, 6 to 8, 15 and 22 prepared to give specified degree of polymerization of PVA, structure of the monomer unit, type of the surfactant, and mass ratio of the surfactant to water were particularly superior in handleability at 60° C., and the gelation ability at low temperatures, and the solutions also exhibited superior results of the evaluation of the solubility were obtained. It is to be noted that in, for example, Example 12 in which PVA14 was used, the gelation ability at low temperatures was deteriorated, and this deterioration is believed to result from a shorter alkyl group of the alkyl-modified PVA having carbon atoms of as small as 5. Further, it was seen that the state of the solutions of Examples 16 and 20 was somewhat inferior. The inferior state of the solutions is believed to result from different structures of the monomer having an alkyl group having 5 to 29 carbon atoms, and inferior compatibility between the surfactant and PVA. Moreover, in Examples 18, 19 and 23, the gelation ability at low temperatures was deteriorated. This deterioration is considered to result from different structures of the surfactant, and a great amount of the surfactant added leading to impaired hydrophobic interactions of the alkyl-modified PVA even at 20° C.

On the other hand, in the cases in which: PVA did not satisfy defined requirements, i.e., number of carbon atoms of the alkyl group, the percentage modification and the degree of saponification (Comparative Examples 1 to 4 and 11); the structure of the surfactant did not satisfy defined requirements (Comparative Examples 5 to 9); and any surfactant was not used (Comparative Examples 10 and 11), it was found that: a high concentration solution was not obtained; the solubility was deteriorated; the gelation ability at low temperatures was deteriorated; and the like.

INDUSTRIAL APPLICABILITY

The alkyl-modified PVA solution of the present invention has, even in a case in which the solution contains the alkyl-modified PVA at a high concentration, properties of having a low viscosity at high temperatures leading to superior handleability, accompanied by rapidly increased viscosity to result in gelation upon lowering of the temperature. Therefore, the alkyl-modified PVA solution can be suitably used as a solution gelled at low temperatures that is superior in safety and that can be an alternative to PVA-boric acid crosslinking solutions for use in temperature-sensitive binders, gelation agents, temperature-sensitive adhesives, thickening agents and the like.

The invention claimed is:

1. An alkyl-modified vinyl alcohol polymer solution comprising:
   an alkyl-modified vinyl alcohol polymer;
   a surfactant; and
   water,
   wherein:
   the alkyl-modified vinyl alcohol polymer has a monomer unit that comprises an alkyl group having 5 to 29 carbon atoms;
   a percentage content of the monomer unit is no less than 0.05 mol % and no greater than 5 mol %;
   a degree of saponification of the alkyl-modified vinyl alcohol polymer is no less than 20 mol % and no greater than 99.99 mol %; and
   the surfactant is a compound represented by the following formula (I):

  (I)

wherein, in the formula (I),
   $R^1$ represents an alkylene group having 3 to 5 carbon atoms;
   $R^2$ represents a single bond or an alkylene group having 1 to 5 carbon atoms;
   $X^1$ represents a hydrogen atom or an organic group;
   $X^2$ represents a hydrophilic group; and
   m is an integer of 1 to 100,
   wherein provided that m is at least 2, $R^1$s present in a plurality of number are each independently as defined above, and
   wherein the alkyl-modified vinyl alcohol polymer solution has a gelled state at 20° C. and has a viscosity at 60° C. of less than 15,000 mPa·s, or has a viscosity ratio of a viscosity at 20° C. to the viscosity at 60° C. of no less than 25.

2. The alkyl-modified vinyl alcohol polymer solution according to claim 1, wherein $X^2$ represents a carboxyl group or a salt thereof, a sulfonic acid group or a salt thereof, or a group represented by the following formula (II):

  (II)

wherein, in the formula (II), n1 is an integer of 1 to 200.

3. The alkyl-modified vinyl alcohol polymer solution according to claim 1, wherein the organic group represented by $X^1$ is an alkyl group having 1 to 29 carbon atoms or a hydrophilic group.

4. The alkyl-modified vinyl alcohol polymer solution according to claim 3, wherein the hydrophilic group represented by $X^1$ is a group represented by the following formula (III):

  (III)

wherein, in the formula (III), n2 is an integer of 1 to 200.

5. The alkyl-modified vinyl alcohol polymer solution according to claim 1, wherein the monomer unit is represented by the following formula (IV):

  (IV)

wherein, in the formula (IV),
   $R^3$ represents an alkyl group having 5 to 29 carbon atoms; and
   $R^4$ represents a hydrogen atom or an alkyl group having 1 to 8 carbon atoms.

6. The alkyl-modified vinyl alcohol polymer solution according to claim 5, wherein the alkyl-modified vinyl alcohol polymer is obtained by saponifying a copolymer of an unsaturated monomer represented by the following formula (V) with a vinyl ester monomer:

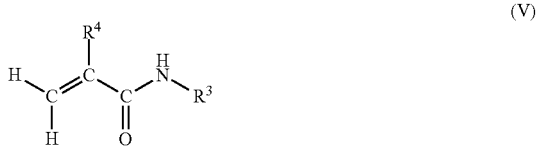  (V)

wherein, in the formula (V), $R^3$ and $R^4$ are as defined in connection with the above formula (IV).

7. The alkyl-modified vinyl alcohol polymer solution according to claim 1, wherein a viscosity average degree of polymerization of the alkyl-modified vinyl alcohol polymer is no less than 200 and no greater than 5,000.

8. The alkyl-modified vinyl alcohol polymer solution according to claim 1, wherein a mass ratio of the surfactant to the water (mass of the surfactant/mass of the water) is no less than 1/99 and no greater than 40/60.

9. The alkyl-modified vinyl alcohol polymer solution according to claim 1, wherein a concentration of the alkyl-modified vinyl alcohol polymer is no less than 0.5% by mass and no greater than 50% by mass.

10. The alkyl-modified vinyl alcohol polymer solution according to claim 1, wherein $R^2$ represents a single bond.

11. The alkyl-modified vinyl alcohol polymer solution according to claim 10, wherein $X^1$ represents a hydrogen atom.

12. The alkyl-modified vinyl alcohol polymer solution according to claim 1, wherein the surfactant is a diblock copolymer.

* * * * *